United States Patent [19]

Ofstein

[11] Patent Number: 5,003,002

[45] Date of Patent: Mar. 26, 1991

[54] BLENDS OF AMORPHOUS NYLON AND ETHYLENE VINYL ALCOHOL COPOLYMERS AND LAMINATES AND CONTAINERS MADE THEREFROM

[75] Inventor: David E. Ofstein, Williamsburg, Va.

[73] Assignee: Rampart Packaging Inc., Del.

[21] Appl. No.: 393,197

[22] Filed: Aug. 14, 1989

[51] Int. Cl.$^5$ .............................................. C08L 29/02
[52] U.S. Cl. .................... 525/58; 428/475.8; 428/36.6; 525/56
[58] Field of Search ................ 525/58, 56; 428/475.8, 428/36.6

[56] References Cited

U.S. PATENT DOCUMENTS

| | | | |
|---|---|---|---|
| 3,726,945 | 4/1973 | Bottenbruch et al. | 260/857 L |
| 3,814,792 | 6/1974 | Arakawa et al. | 264/176 R |
| 3,857,754 | 12/1974 | Hirata et al. | 161/227 |
| 3,931,449 | 1/1976 | Hirata et al. | 428/474 |
| 3,932,692 | 1/1976 | Hirata et al. | 428/474 |
| 3,975,463 | 8/1976 | Hirata et al. | 260/897 B |
| 4,347,332 | 8/1982 | Odorzynski et al. | 524/169 |
| 4,427,825 | 1/1984 | Degrassi et al. | 525/56 |
| 4,429,076 | 1/1984 | Saito et al. | 525/57 |
| 4,451,599 | 5/1984 | Odorzynski et al. | 524/169 |
| 4,464,438 | 8/1984 | Lu | 428/516 |
| 4,468,427 | 8/1984 | Degrassi et al. | 428/220 |
| 4,500,677 | 2/1985 | Maruhashi et al. | 525/57 |
| 4,501,797 | 2/1985 | Super et al. | 428/349 |
| 4,501,798 | 2/1985 | Koschak et al. | 428/349 |
| 4,551,366 | 11/1985 | Maruhashi et al. | 428/35 |
| 4,552,801 | 11/1985 | Odorzynski et al. | 428/220 |
| 4,552,819 | 11/1985 | Hibino | 428/516 |
| 4,557,780 | 12/1985 | Newsome et al. | 156/244.11 |
| 4,562,118 | 12/1985 | Maruhashi et al. | 428/412 |
| 4,724,185 | 2/1988 | Shah | 428/36.7 |
| 4,800,129 | 1/1989 | Deak | 428/475.8 |
| 4,952,628 | 8/1990 | Blatz | 525/56 |
| 4,966,795 | 10/1990 | Genske et al. | 428/516 |

FOREIGN PATENT DOCUMENTS 0063006  4/1982  European Pat. Off. .

*Primary Examiner*—Edith Buffalow
*Attorney, Agent, or Firm*—Donald F. Haas

[57] ABSTRACT

An oxygen barrier blend for use in containers requiring good oxygen barrier properties which comprises more than 70% of an ethylene vinyl alcohol copolymer and the balance an amorphous nylon having no melting point. Such a blend is used in a laminate structure which can be thermoformed into such oxygen barrier containers.

9 Claims, No Drawings

BLENDS OF AMORPHOUS NYLON AND ETHYLENE VINYL ALCOHOL COPOLYMERS AND LAMINATES AND CONTAINERS MADE THEREFROM

FIELD OF THE INVENTION

This invention relates to blends of amorphous nylon and ethylene vinyl alcohol copolymers (EVOH). Further, this invention relates to laminates which are made from such a blend and protective layers such as polyolefin layers. Also, the invention relates to containers formed from such laminates.

BACKGROUND OF THE INVENTION

Coextruded structures containing two or more different layers are becoming more commonplace, especially in the food packaging industry. Multi-layer plastic structures are displacing many materials, such as glass and metal containers, due to cost and performance factors. One route frequently used in the production of plastic containers is thermoforming from coextruded sheet. A typical structure will have an oxygen barrier layer to extend the shelf life, outer or cap layers for moisture, taste and/or odor barrier purposes, and adhesive layers to bond the barrier layer to the outer layers.

Laminates containing ethylene vinyl alcohol copolymer (EVOH) layers as the oxygen barrier layer are well known and are commonly used. EVOH is an excellent material for such use but it does have some drawbacks. For instance, the processability of EVOH in some thermoforming processes leaves something to be desired and it is difficult to make some types of containers, such as deep draw containers wherein the length/diameter ratio is greater than 1.0. The most common processing problem is fibrillation of the laminate which is the necking or thinning of the barrier layer in striations.

The processability of EVOH has been increased by blending it with various crystalline nylon materials, i.e., nylons which have a defined melting point. Such nylon materials generally have poor oxygen barrier properties and thus blending them with EVOH decreases the oxygen barrier properties of the EVOH material making the blend less suitable for many applications such as in the food and medical industries. Furthermore, many crystalline nylons require the use of plasticizers to make them compatible with the EVOH and these plasticizers may degrade the EVOH over a period of time.

Amorphous nylon materials having no melting point, have better oxygen barrier properties and exhibit better processability than the crystalline nylon materials discussed above. Such amorphous nylon can be used at lower temperatures so the gelling reaction which often occurs between nylon and EVOH can be prevented. Also, the oxygen barrier properties of amorphous nylon materials tend to increase as the moisture level goes up which can help compensate for the decrease in oxygen barrier properties of the EVOH as moisture level goes up.

SUMMARY OF THE INVENTION

A major aspect of the present invention is an ethylene vinyl alcohol copolymer blend which comprises more than 70% of an ethylene vinyl alcohol copolymer and the balance an amorphous nylon having no melting point. Such a blend has usefulness in containers requiring good oxygen barrier properties. A further aspect of the present invention is a laminate structure which comprises the EVOH/amorphous nylon blend discussed above and one or more adjacent protective layers which can be formed of polyolefins. Also contemplated is a method for producing an oxygen barrier container which comprises forming the EVOH/amorphous nylon blend discussed above, making it into a laminate with polyolefin protective layers and then thermoforming the laminate into a container.

DETAILED DESCRIPTION OF THE INVENTION

As discussed above, ethylene vinyl alcohol copolymers are well known to exhibit very good oxygen barrier properties and such materials have been described in many patents such as U.S. Pat. Nos. 3,975,463 and 4,468,427. EVOH products made by several manufacturers have been used commercially for some time in the manufacture of oxygen barrier containers.

The amorphous nylon materials which are used in the present invention have not been commonly used in the manufacture of EVOH barrier containers but rather have been used in monolayer containers requiring moderate barrier properties. Amorphous nylon materials do not have a regular defined melting point. Rather, they soften gradually as the temperature increases over a broad range. The polymer may be manufactured by condensation of hexamethylenediamine, terphthalic acid and isophthalic acid such that 65 to 85% of the polymer units are derived from hexamethyleneisophthalamide.

I have found that an ethylene vinyl alcohol copolymer blend which comprises more than 70% of EVOH and the balance an amorphous nylon having no melting point can be used to form a laminate structure which can be thermoformed into an excellent oxygen barrier container. The laminate structure comprises a layer of the above blend and at least one adjacent protective layer, preferably at least two layers which are formed of polyolefins. The polyolefin materials may be polypropylene, polyethylene, copolymers of propylene and ethylene, polystyrene and blends thereof.

The blends may be formed in any dry blending equipment that will provide a consistent mix of the two components to the extruder. The preferred blending procedure is as follows: dry blend the two materials together and feed the blend to an extruder under typical EVOH processing conditions.

The blend may be used to form a laminate. The preferred method is coextrusion of the blend with the materials forming the other layers. Commonly, there will be two outer polyolefin protective layers and two intermediate adhesive layers which bond the outer layers to the inner EVOH layers. The adhesive may be a maleic anhydride-modified polypropylene or polyethylene or some other adhesive.

The containers of the present invention are manufactured by forming the oxygen barrier blend discussed above, then forming a laminate which comprises the oxygen barrier layer and adjacent polyolefin layers and finally thermoforming the laminate into a container. The thermoforming is preferably carried out by solid phase pressure forming (SPPF) but other thermoforming processes such as melt phase pressure forming may also be used. Solid phase pressure forming involves making thin-walled cupped articles from a sheet or billet of a, for example, polyolefin plastic material such as polypropylene, polyethylene, etc. by introducing a thin sheet or billet thereof in the solid-phase state (below the crystalline melting point and above the glass transition point) between a forming plug and a mold having an end opening, moving the forming plug into the mold opening with the sheet or billet to carry a bulged portion of the sheet or billet into the mold, and introducing pressure fluid into the bulged portion of the sheet or billet to form the article in the mold.

The present invention is especially useful in the production of oxygen barrier containers using EVOH which are known as deep draw containers. As discussed above, EVOH is difficult to use in such deep draw applications because it tends to cause fibrillation in the container being formed. By blending in amorphous nylon materials which have no defined melting point, deep draw containers which have acceptable barrier properties can be produced without fibrillation.

EXAMPLE 1

Three different nylons, two crystalline and one amorphous were blended with two different ethylene vinyl alcohol copolymers, 30 and 27 mole percent ethylene content. These blends were evaluated for oxygen permeability and then 6 oz. clear containers were formed by an SPPF process on an Illig 3715 lab former. The laminate structure consisted of 4% by weight of a 75/25 EVOH/nylon blend, 4% of an adhesive and 92% of a polypropylene homopolymer having a melt index of 2.

The oxygen permeability results are set forth in Table 1 below. Selar ® OH3003 resin is an ethylene vinyl alcohol copolymer containing 30 mole percent ethylene made by DuPont. Eval ® L101 resin is an ethylene vinyl alcohol copolymer having 27 mole percent ethylene made by Quantum. Selar ® PA 3426 resin is an amorpous nylon having no melting point made by DuPont. Capron ® 1539 resin and Zytel ® Fe-2400 resin are crystalline nylon materials made by Allied and DuPont, respectively, and having melting points of 395° F. and 421° F.

TABLE 1

| Nylon | EVOH | Oxygen Permeaility (cc-mil/100 in $^2$/day)* |
|---|---|---|
| — | Selar ® OH3003 | 0.006 |
| Selar ® PA3426 | Selar ® OH3003 | 0.004 |
| Capron ® 1539 | Selar ® OH3003 | 0.009 |
| Zytel ® FE-2400 | Selar ® OH3003 | 0.011 |
| — | EVAL ® L101 | 0.01** |
| Selar ® PA3426 | EVAL ® L101 | 0.005 |
| Capron ® 1539 | EVAL ® L101 | 0.007 |
| Zytel ® FE-2400 | EVAL ® L101 | 0.009 |

*at approximately 0% relative humidity at 20° C.
**at 65% relative humidity at 20° C.

It can be seen from the above table that the oxygen permeability of the EVOH blends with amorphous nylon are significantly lower than the oxygen permeability of the EVOH blends with the two crystalline nylon materials. Furthermore, the quality of the processability of the amorphous nylon blends based on observation of fibrillation during the forming of the containers was as good as or better than the EVOH blends with the crystalline nylon materials. The Selar ® OH3003/Selar ® PA3426 blend was judged to to be good, the Selar ® OH3003/Capron ® 1539 was blend judged to be only fair and the Selar ® OH3003-/Zytel ® FE-2400 blend was judged to be good as well. The EVAL ® L101/Selar ® PA 3426 blend was judged to be good whereas the EVAL ® L101/Capron ® 1539 blend was judged to be only fair and the EVAL ® L101/Zytel ® FE-2400 blend was judged to be poor.

EXAMPLE 2

A similar comparative experiment was performed with a 70/30 blend of AT4403, an EVOH material containing 54% ethylene made by Nippon Gohsei of Japan, with Selar ® PA and Zytel ® resins. The results are shown in Table 2 below. The quality relating relates to fibrillation with 0 meaning no fibrillation and 3 meaning severe fibrillation.

TABLE 2

| Nylon | Quality Rating | Oxygen Permeability (cc/Pack/d)* |
|---|---|---|
| Selar ® PA 3426 | 0.1 | 0.008 |
| Zytel ® FE-2400 | 0.3 | 0.008 |

*cubic centimeters per container per day

It can be seen that there is no significant difference between the two blends in terms of fibrillation quality and oxygen permeability when 30% of the nylon materials are used. Furthermore, the oxygen permeability is higher than the oxygen permeability of the materials of Example 1.

I claim:

1. An ethylene vinyl alcohol copolymer blend which comprises more than 70% of an ethylene vinyl alcohol copolymer and the balance an amorphous nylon having no melting point.

2. An oxygen barrier blend for use in containers requiring good oxygen barrier properties which comprises more than 70% of an ethylene vinyl alcohol copolymer and the balance an amorphous nylon having no melting point.

3. A laminate structure comprising a layer which is comprised of more than 70% of of an ethylene vinyl alcohol copolymer and the balance an amorphous nylon having no melting point and at least one adjacent protective layer.

4. An oxygen laminate structure which comprises an oxygen barrier layer which is comprised of more than 70% of an ethylene vinyl alcohol copolymer and the balance an amorphous nylon having no melting point and adjacent polyolefin layers.

5. The structure of claim 4 wherein the polyolefin layers are comprised of a material selected from the group consisting of polypropylene, polyethylene, copolymers of propylene and ethylene, polystyrene and blends thereof.

6. A container formed from the laminate of claim 4.

7. A method for the production of an oxygen barrier container which comprises forming an oxygen barrier blend comprised of more than 70% of an ethylene vinyl alochol copolymer and the balance an amorphous nylon having no melting point, forming a laminate comprised of a layer of said blend and adjacent polyolefin layers, and thermoforming the laminate into a container.

8. The method of claim 7 wherein the polyolefin layers are comprised of a material selected from the group consisting of polypropylene, polyethylene, copolymers of propylene and ethylene, polystyrene and blends thereof.

9. A container formed by the method of claim 7.

* * * * *